US007213396B2

(12) United States Patent
Ries-Mueller et al.

(10) Patent No.: US 7,213,396 B2
(45) Date of Patent: May 8, 2007

(54) METHOD AND DEVICE FOR OPERATING AN INTERNAL COMBUSTION ENGINE

(75) Inventors: Klaus Ries-Mueller, Bad Rappenau (DE); Michael Baeuerle, Ditzingen-Heimerdingen (DE); Andreas Blumenstock, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 10/504,788

(22) PCT Filed: Feb. 6, 2003

(86) PCT No.: PCT/DE03/00331

§ 371 (c)(1),
(2), (4) Date: Aug. 13, 2004

(87) PCT Pub. No.: WO03/069135

PCT Pub. Date: Aug. 21, 2003

(65) Prior Publication Data

US 2005/0091965 A1 May 5, 2005

(30) Foreign Application Priority Data

Feb. 14, 2002 (DE) .............................. 102 05 969
Aug. 1, 2002 (DE) .............................. 102 35 194

(51) Int. Cl.
*F01N 3/00* (2006.01)

(52) U.S. Cl. ........................... 60/289; 60/274; 60/285; 60/299

(58) Field of Classification Search .................. 60/274, 60/285, 289, 290, 299; 123/90.15, 90.16, 123/90.17
See application file for complete search history.

(56) References Cited

U.S. PATENT DOCUMENTS 3,751,916 A * 8/1973 Hayashida et al. ........... 60/289
3,931,710 A * 1/1976 Hartel .......................... 60/276

(Continued)

FOREIGN PATENT DOCUMENTS

DE 44 00 536 7/1994
DE 195 01 386 8/1996

(Continued)

*Primary Examiner*—Thomas Denion
*Assistant Examiner*—Diem Tran
(74) *Attorney, Agent, or Firm*—Kenyon & Kenyon LLP (57) ABSTRACT

A method for operating an internal combustion engine by introducing air, in which the air is conducted into the induction region of the internal combustion engine following shutoff of the internal combustion engine. If necessary, the intake valves and the exhaust valves of at least one cylinder are moved into a position in which at least one intake valve and one exhaust valve of a combustion chamber of the internal combustion engine are open simultaneously. The method may be used in for an internal combustion engine having an electric turbocharger for the introduction of air.

4 Claims, 6 Drawing Sheets

U.S. PATENT DOCUMENTS

| | | | |
|---|---|---|---|
| 3,967,929 A * | 7/1976 | Tamazawa et al. | 422/109 |
| 4,009,695 A | 3/1977 | Ule | |
| 4,257,227 A * | 3/1981 | Sato et al. | 60/290 |
| 4,484,441 A * | 11/1984 | Kobayashi et al. | 60/285 |
| 4,534,173 A * | 8/1985 | Tsukamoto | 60/606 |
| 5,233,830 A * | 8/1993 | Takeshima et al. | 60/278 |
| 5,588,411 A | 12/1996 | Kreuter et al. | |
| 5,590,521 A | 1/1997 | Schnaibel et al. | |
| 6,293,236 B1 | 9/2001 | De Francisco | |

FOREIGN PATENT DOCUMENTS

| | | |
|---|---|---|
| DE | 196 08 060 | 7/1997 |
| DE | 197 05 421 | 5/1998 |
| DE | 197 35 455 | 11/1998 |
| EP | 107 08 37 | 1/2001 |
| JP | 01-190927 * | 8/1989 |

* cited by examiner

METHOD AND DEVICE FOR OPERATING AN INTERNAL COMBUSTION ENGINE

FIELD OF THE INVENTION

The present invention relates to a method for operating an internal combustion engine.

BACKGROUND INFORMATION

A method and a device for operating an internal combustion engine is referred to in German patent document 44 00 536. According to this method, secondary air is introduced into the exhaust-gas pipe system during operation of the internal combustion engine and cools the high temperature segment of a catalytic converter as well a muffler element. Modern catalytic converters reach temperatures at a high engine load (full load) of approximately 1000° C. If the vehicle is switched off shortly after such full load operation, the outer wall temperature of the catalytic converter may quickly reach several 100° C. This results to a certain extent in a heat build-up since during still stand of the vehicle, there is no cooling from the head wind.

However, stopping the vehicle with a running engine following full load operation is less critical since the comparatively cool exhaust air of the internal combustion engine that is at a temperature of ca. 300° C. to 400° C. during idling is able to draw off excessive heat from the hotter catalytic converter, thereby cooling the catalytic converter via the exhaust air. The heat build-up at vehicle still stand with a switched off engine may heat the catalytic converter wall to the extent that dry grass, for example, on which the vehicle is parked may catch fire. Some automobile manufacturers activate a warning light in the vehicle cockpit given a risk of grass catching fire as a result of the heat radiation from the catalytic converter, which also involves the risk of vehicle fire. The driver may then move the vehicle to a different parking location or allow the internal combustion engine to idle for a while in order for the catalytic converter to cool.

A vehicle also emits pollutants after shutoff. Among others, small quantities of hydrocarbons (HC) escape from the induction pipe into the environment. Sources of such HC emission include, for example, crankcase ventilation or residues on an injection valve or tank ventilation.

These emissions will have to be eliminated due to stricter exhaust-gas limit values, in the future.

SUMMARY OF THE INVENTION

In view of this background, an object of an exemplary method of the present invention is to provide a method for reducing the danger of vehicle fire without the indicated measures as well as for preventing HC emissions following shutoff of the internal combustion engine.

This objective is achieved in a method in which the air is conducted into the induction region of the internal combustion engine when the internal combustion engine is switched off.

In this context, it is assumed that the air is conducted through the internal combustion engine into the exhaust-gas pipe system given a simultaneously open intake and exhaust valve of at least one cylinder or combustion chamber of the internal combustion engine.

This method may be used in a particularly advantageous manner for a device having an electric turbocharger. Internal combustion engines typically do not have any blowers that would be capable of transporting air into the induction region. However, this is different in the case of internal combustion engines having electric auxiliary turbochargers. In general, turbochargers result in a variety of advantages independent of the engine design, i.e., for diesel engines as well as gasoline engines (Otto engines) having manifold injection or direct injection. Examples of such advantages include a savings with respect to consumption and an increase in performance. However, the lack of spontaneity in the lower speed range is disadvantageous for today's conventional exhaust-gas turbochargers. Engines having exhaust-gas turbochargers react in a delayed manner to a torque request because pressure in the exhaust-gas system must first be reduced in order to be able to bring the turbocharger to speed and as such to achieve a supply of air necessary for the torque increase into the induction region. An additional electric turbocharger may be used to reduce this delayed response. This refers to an electrically operating ventilation blower that is present in addition to the exhaust-gas turbocharger and is connected in series to a certain extent with the exhaust-gas turbocharger. This blower may be circumvented via a bypass as a function of the operating point. Such an electric turbocharger for supporting a conventional exhaust-gas turbocharger is referred to for example in European Application EP 107 08 37.

The particular advantage of the exemplary embodiment and/or exemplary method of the present invention is that this already present electric turbocharger is able to be used to decrease the risk of fire from a hot catalytic converter in the case of a switched off vehicle and for preventing the HC emissions following shutoff of the internal combustion engine. In accordance with the exemplary embodiment and/or exemplary method of the present invention, the electric turbocharger is used to conduct air into the induction region of the internal combustion engine, this air being conducted through the internal combustion engine into the exhaust-gas pipe system and as such into or through the catalytic converter given a shutoff internal combustion engine and open gas-exchange valves of the internal combustion engine. It follows from the present representation that the exemplary embodiment and/or exemplary method of the present invention is not limited to the use of an electric turbocharger but that every blower capable of supplying air to the induction region of the internal combustion engine during still stand of the internal combustion engine may be used.

In the exemplary method, a measurement for a temperature in the exhaust-gas pipe system is formed in a time-dependent relationship with the shutoff of the internal combustion engine, this measurement is compared to a threshold value, and the air is introduced into the induction region of the internal combustion engine when the measurement exceeds the threshold value.

A further embodiment distinguishes itself in that the measurement for a temperature in the exhaust-gas pipe system is formed on the basis of a quantity measured in the exhaust-gas pipe system.

A further embodiment provides for the measurement for a temperature in the exhaust-gas pipe system to be formed on the basis of a temperature model for a temperature in the exhaust-gas system.

A further embodiment provides for the measurement for a temperature in the exhaust-gas pipe system to also be formed after the start of the introduction of air and for the introduction of air to be maintained until the indicated measurement is less than an additional threshold value.

An additional or alternative measure provides for the air to be introduced for a predetermined time period. An additional or alternative measure provides for the introduction of air to be maintained until a temperature in the internal combustion engine is less than a further threshold value.

In a further embodiment, at least one intake valve and one exhaust valve in at least one cylinder (combustion chamber) of the internal combustion engine are opened simultaneously. In the case of an internal combustion engine in which the intake valves and exhaust valve are operated by camshafts, the camshaft is able to be moved into a corresponding position by accordingly controlling the starter. In the case of an internal combustion engine having fully variable valve control, this may occur directly by operating the valve actuators, without requiring operation of the starter.

A further measure provides for a valve stroke exceeding the minimum valve stroke to be set for an internal combustion engine having combustion chamber filling that is controlled by a variable stroke of the intake valves.

The exemplary embodiment and/or exemplary method of the present invention is also particularly advantageous when the combustion chamber is cooled by air flow and is additionally filled with cooler air. In particular, this results in the case of a subsequent direct start (start without starter) in an improved starting performance.

In this context, it is conceivable for the air flow to be produced during run-down of the engine (following firing), i.e., while the engine reduces its speed to 0 rpm. This has the advantage that residual gas still remaining is the cylinder is expelled. The air flow may also occur following shutoff of the engine (engine speed equal to 0 rpm).

The exemplary embodiment and/or exemplary method of the present invention also relates to a device for implementing at least one of the methods as recited in the preceding claims, an electric turbocharger being used for the introduction of air.

The exemplary embodiment and/or exemplary method of the present invention also relates to an electronic control device for implementing at least one of the abovementioned methods or one of the embodiments.

DETAILED DESCRIPTION

Figure 1:
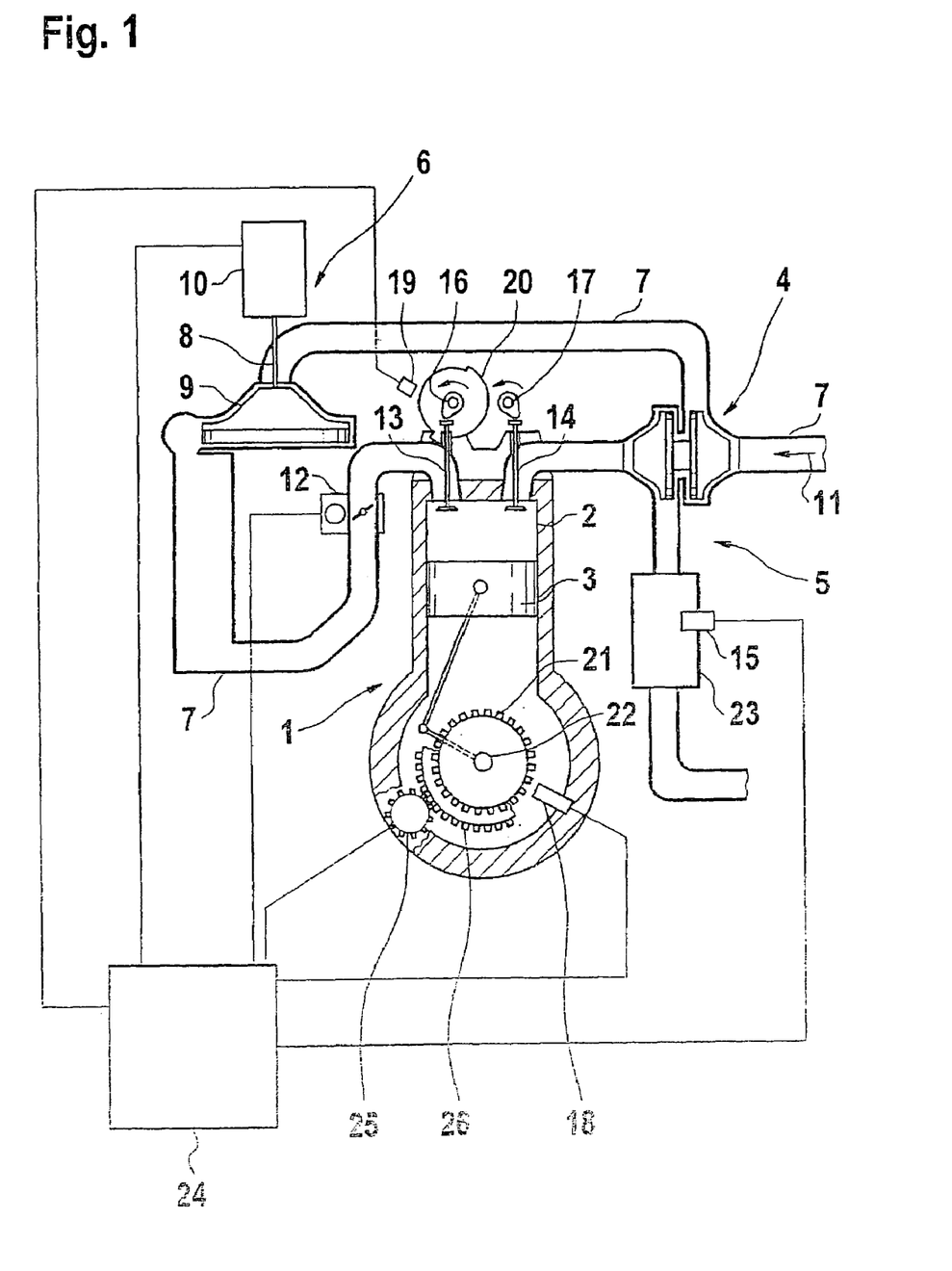
FIG. 1 shows a first exemplary embodiment of a device of the invention together with the technical environment of the present invention.

Reference numeral 1 in FIG. 1 designates an internal combustion engine having a combustion chamber 2 above a piston 3 and an exhaust-gas turbocharger 4 in an exhaust-gas pipe system 5 as well as having an arrangement 6 for introducing air into induction region 7 of the internal combustion engine. Arrangement 6 may be an electric turbocharger that is used in addition to support a conventional exhaust-gas turbocharger 4.

However, the exemplary embodiment and/or exemplary method of the present invention is not limited to the use of an electric turbocharger in connection with a conventional exhaust-gas turbocharger. Instead, it is essential for a blower in the induction region to transport air into the induction region during still stand of the internal combustion engine. Electric turbocharger 6 has a delivery wheel 9, which is driven via a shaft 8 by an electric motor 10. In the driven state, delivery wheel 9 feeds air into induction region 7.

The arrow designated by reference numeral 11 represents the flow direction of air flowing into induction region 7. The supplied air is conducted via a throttle valve device 12 and open intake valves 13 and exhaust valves 14 through combustion chamber 2 into exhaust-gas pipe system 5. The air flows through an exhaust-gas device 23, which may be a catalytic converter, and transports excess heat from the exhaust-gas device into the environment. This cooling protects exhaust-gas device 13 from heat build-up during still stand of the internal combustion engine when there is no cooling effect from cooler exhaust gas. A control unit 24, e.g. an electronic control device, controls the cooling of the exhaust-gas device in accordance with the exemplary embodiment and/or exemplary method of the present invention during still stand of the internal combustion engine. For this purpose, the signal of an exhaust-gas analyzer probe 15, from which control unit 14 forms a measurement for the temperature of the exhaust-gas device, is able to be supplied to control unit 24. Exhaust-gas analyzer probe 15 may be situated in front of or inside of exhaust-gas device 23.

Probe 15 may be a temperature sensor. Alternatively, the probe may also be an exhaust-gas probe for recording the concentration of an exhaust-gas component in the exhaust gas, the signals of the probe allowing conclusions regarding temperature. For example, the internal resistance of a conventional lambda probe may be used for determining the temperature.

Control unit 24 controls electric motor 10 during still stand of the internal combustion engine as a function of the formed measurement. The representation of FIG. 1 shows intake valve 13 and exhaust valve 14 operated by a camshaft 16 and a camshaft 17. In the represented state, both valves are open, intake valve 13 already being open and exhaust valve 14 still being open. This state also designated as a valve overlap occurs in four-stroke engines during transition from the exhaust stroke, during which the combusted gases are expelled from the combustion chamber into exhaust-gas pipe system 5, to the intake stroke, in which fresh air or a fresh mixture is drawn from induction region 7 into the combustion chamber. In the case of internal combustion engines having a large number of cylinders, it may be assumed that there is a valve overlap at any given time in any given cylinder. In this case, fresh air may be transported at any time from induction region 7 through combustion chamber 2 into the exhaust-gas pipe region. In the case of internal combustion engines having less cylinders (less than or equal to 4), it may occur that a valve overlap does not take place in a certain position of the crankshaft and the camshaft of the internal combustion engine during still stand in any of the cylinders. This state is able to be detected using angle sensors at the crankshaft and the camshaft. An inductive sensor 19 at camshaft 16 or 17 provides in connection with a camshaft pulse-generating wheel 20, information as to whether a certain cylinder of the internal combustion engine or its piston is in the first half (induction/compression) or in the second half (combustion/exhaust) of a work cycle.

A further inductive sensor 18 provides together with a comparatively sensitive sequence of ferromagnetic markings 21 of a crankshaft pulse-generating wheel 22, information regarding the position of the piston and the camshafts within each half of the work cycle. Since the rotational angle of the crankshaft and the camshafts at which a valve overlap occurs is known, the analysis of the signals of inductive sensors 18 and 19 are able to be used to evaluate whether there is a valve overlap. If this is not the case and the exemplary method of the present invention is to be performed, control unit 24 is able to activate a starter 25, which rotates the crankshaft via a toothed ring represented as segment 26 and connected in a torsionally fixed manner to the crankshaft to the extent that a valve overlap occurs. For the sake of completion, it is mentioned that rotation of the crankshaft also results in rotation of the camshafts since these shafts are connected to one another for example via toothed belts, chains, or toothed wheels to have synchronous phases.

Figure 2:
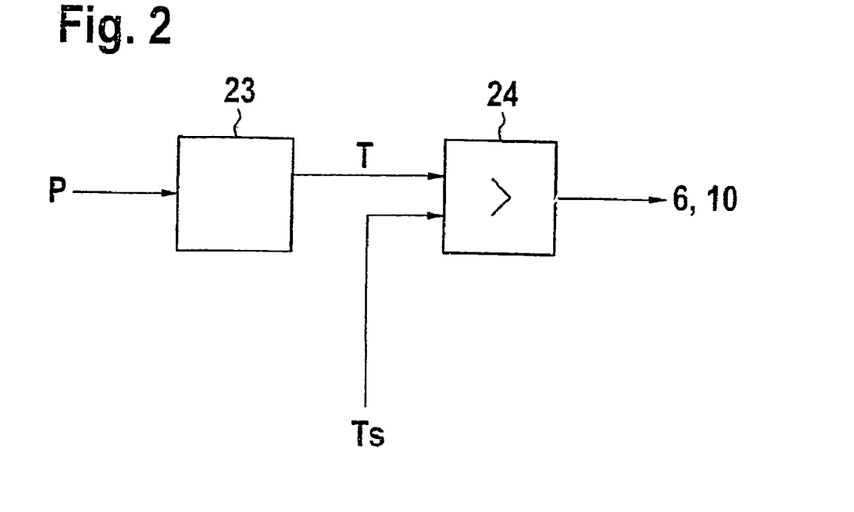
FIG. 2 shows an exemplary embodiment of the method of the present invention for activating the introduction of air.

FIG. 2 shows an exemplary embodiment of the method of the present invention in the form of functional blocks. Parameters P of the internal combustion engine or of the exhaust-gas pipe system are supplied to block 23 to form a measurement T for a temperature in the exhaust-gas pipe system therefrom. In this instance, P may represent the signal of probe 15. However, P may also represent an ensemble of operating parameters of the internal combustion engine, such as intake air quantity, rotational speed, intake air temperature, etc., from which a measurement for temperature T in the exhaust-gas pipe system is formed in block 23 using a temperature model.

Exhaust-gas and catalytic converter temperature models are referred to for example in U.S. Pat. No. 5,590,521 so that no further explanation is required here. Measurement T for the temperature in the exhaust-gas pipe system, which is formed in block 23, is compared to a predetermined threshold value Ts in a block 24. If T is greater than Ts, electric exhaust-gas turbocharger 6 or its electric motor 10 is activated. The functional blocks in FIG. 2 as well as the functional blocks in FIGS. 3 through 5 are realized by software modules and hardware components, such as output stages, in control unit 14.

Figure 3:
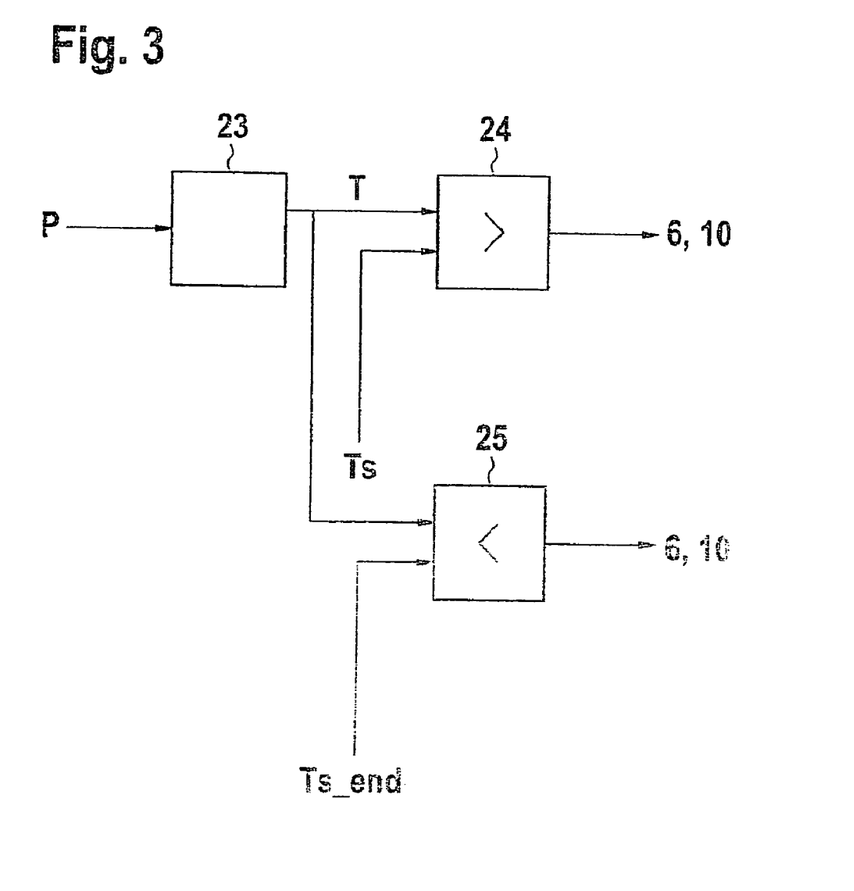
FIG. 3 shows an exemplary embodiment of a method of the present invention having one alternative for deactivating the introduction of air.

FIG. 3 shows a further embodiment of the method of the present invention. In addition to the structure shown in FIG. 2, FIG. 3 has a further block 25, in which temperature T or measurement T for the temperature in the exhaust-gas pipe system is compared with a further threshold value Ts_end. The function of this comparison in block 25 is that electric turbocharger 6 or its electric motor 10 is deactivated again when temperature T is less than threshold value Ts_end. Of course, Ts_end is less than threshold value Ts.

Figure 4:
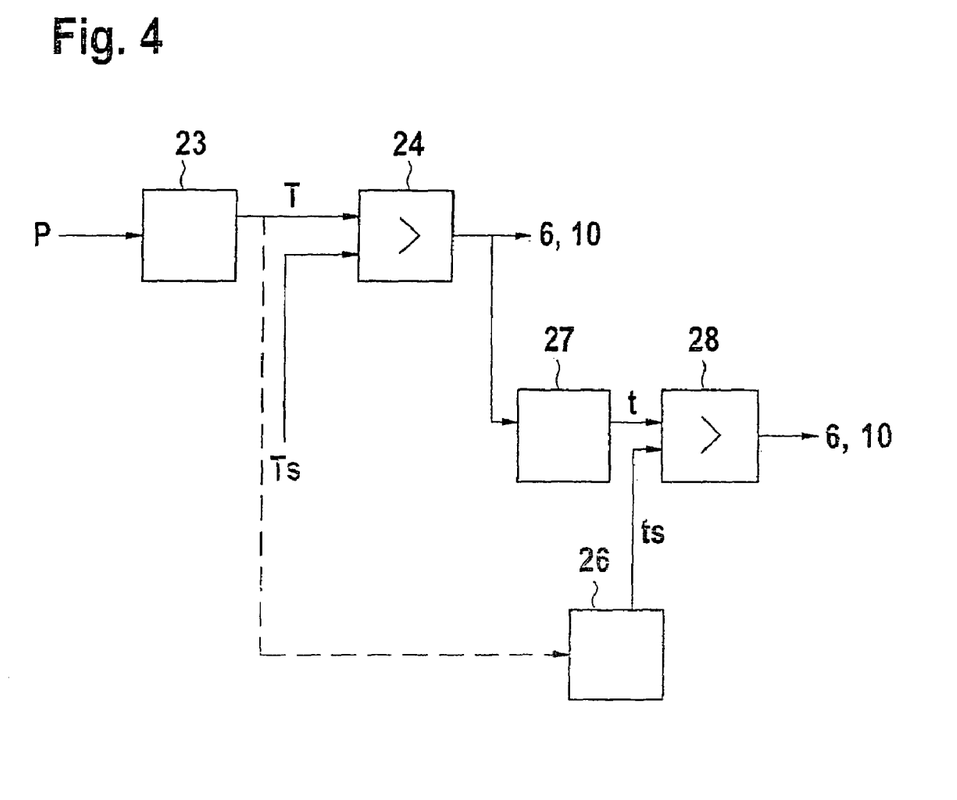
FIG. 4 shows another exemplary embodiment of a method of the present invention having one alternative for deactivating the introduction of air.

A further example of a deactivation of the introduction of air into induction region 7 is shown in FIG. 4. Temperature T or measurement T for a temperature in the exhaust-gas pipe region is subsequently supplied not only to block 24 but also at the same time to block 26. Block 26 determines as a function of value T a threshold value ts, which is supplied to block 28 and represents a desired on-period of the electric turbocharger. The output signal of block 24, which activates the electric turbocharger, is supplied in parallel to a block 27 and triggers a counting operation there. The result of this counting operation is supplied as a time variable t to block 28, in which it is compared to threshold value ts. As soon as t is greater than ts, block 28 deactivates electric exhaust-gas turbocharger 6 or its electric motor 10 and thus ends the introduction of air into induction region 7 of internal combustion engine 1. This corresponds with a time control of the air supply, the time span of the air supply being able to be predefined in a fixed manner or, as shown here, being able to be predefined as a function of the value of temperature T. For example, an extension of the time span with air supply with increasing values of temperature T is advantageous.

Figure 5:
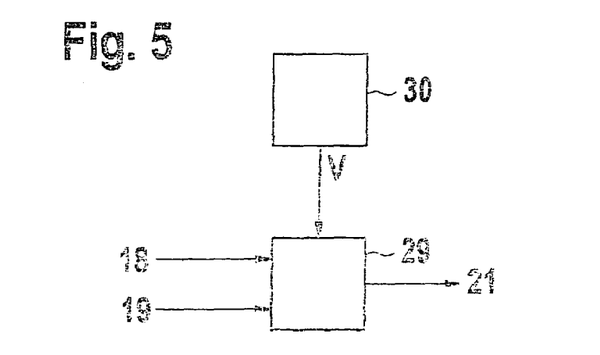
FIG. 5 shows an exemplary embodiment that allows the use of the present invention for internal combustion engines having low cylinder numbers and having gas-exchange valves (intake valves, exhaust valves) controlled by camshafts.

FIG. 5 represents a program module via which control unit 14 controls starter 21 as necessary to produce a valve overlap. Signals from inductive sensors 18 and 19 of the crankshaft and the camshaft are supplied to a block 29 for this purpose. Furthermore, comparison parameters V, e.g. the known angle positions at which a valve overlap is present, from a block 30, e.g. a memory, are supplied to block 29. If the actual angle positions of the crankshaft and the camshafts calculated from the signals of inductive sensors 18 and 19 deviate from the known desired angle positions of the crankshaft and the camshaft at which a valve overlap occurs, block 29 controls starter 21 in order to generate a valve overlap via a rotation of the crankshaft and the camshafts that are coupled with the crankshaft in a rotationally synchronous manner.

Figure 6:
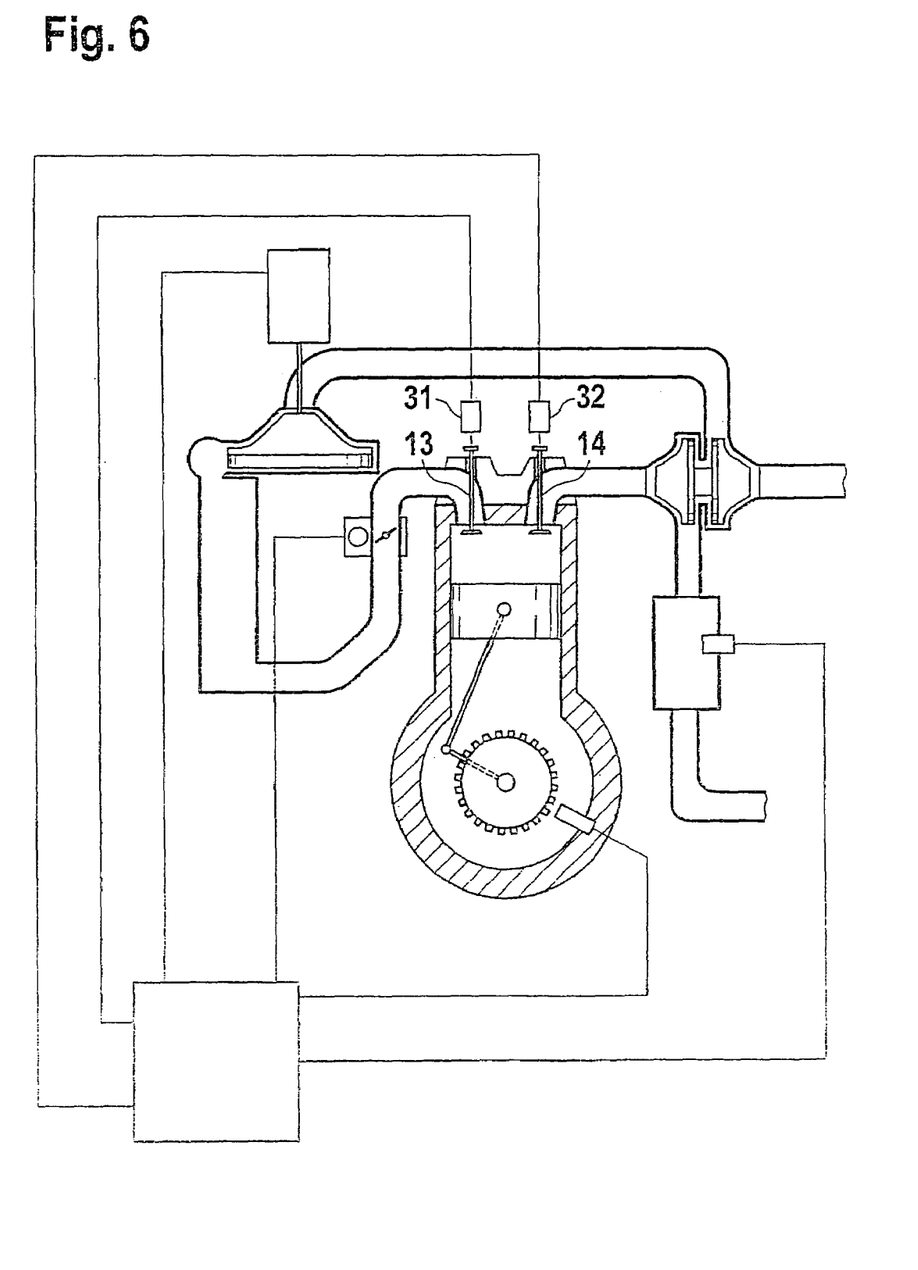
FIG. 6 shows a further exemplary embodiment of the present invention in a modified technical environment that includes a variable valve control.

FIG. 6 shows a variation of a technical environment in which the exemplary embodiment and/or exemplary method of the present invention may be used. The variation consists in that intake valves 13 and exhaust valves 14 are not operated by camshafts but, for example, by electrohydraulic actuators 31 and 32. In this case, valves 13 and 14 are able to be opened independently of the position of the crankshaft and the piston during still stand of the internal combustion engine to allow an air flow from induction region 7 into exhaust-gas pipe region 5 of internal combustion engine 1. Such a fully variable valve control is referred to in U.S. Pat. No. 4,009,695, for example.

A so-called throttle-free load control is also referred to in German patent document no. 195 01 386 (U.S. Pat. No. 5,588,411). Such a throttle-free load control distinguishes itself in that at least the intake valves are able to be opened via a variable stroke. Given a request for high torques, a large stroke is used to achieve a substantial combustion chamber filling and given a request for low torques, e.g. during idling of the internal combustion engine, a very small valve stroke is used to achieve a minimal combustion chamber filling. In the case of such a system, the valve stroke of the intake valves may be more widely open during introduction of the fresh air into induction region 7 of internal combustion engine 1 than the minimal stroke requires in order to reduce the flow resistance of the internal combustion engine. The intake valves may be maximally opened in this case.

Figure 7:
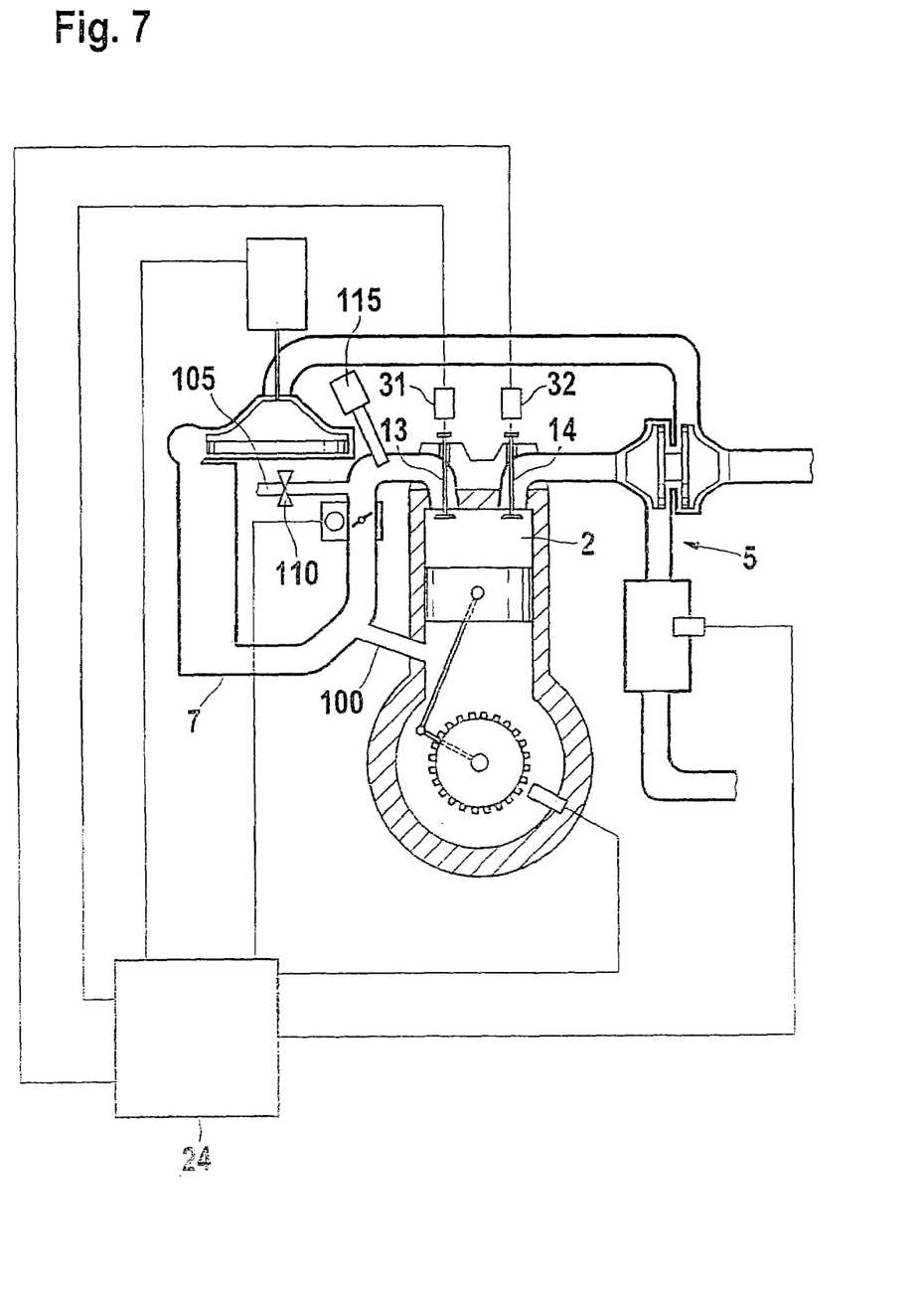
FIG. 7 shows a further exemplary embodiment of the present invention starting out from the exemplary embodiment according to FIG. 6, this exemplary embodiment relating to the prevention of HC emissions after shutoff of the internal combustion engine.

A further exemplary embodiment of the present invention is shown in FIG. 7 on the basis of FIG. 6. In this context, identical reference numbers designate identical elements. In addition to the embodiment according to FIG. 6, FIG. 7 shows a crankcase ventilation 100, a tank ventilation 105 having a tank ventilation valve 110, and an injection valve 115. Injection valve 115 is positioned in this context in induction region 7 of the internal combustion engine so that the injection is manifold injection. Alternatively, the injection may also be performed directly into combustion chamber 2. Tank ventilation 105 and crankcase ventilation 100 are also performed into induction region 7.

Figure 8:
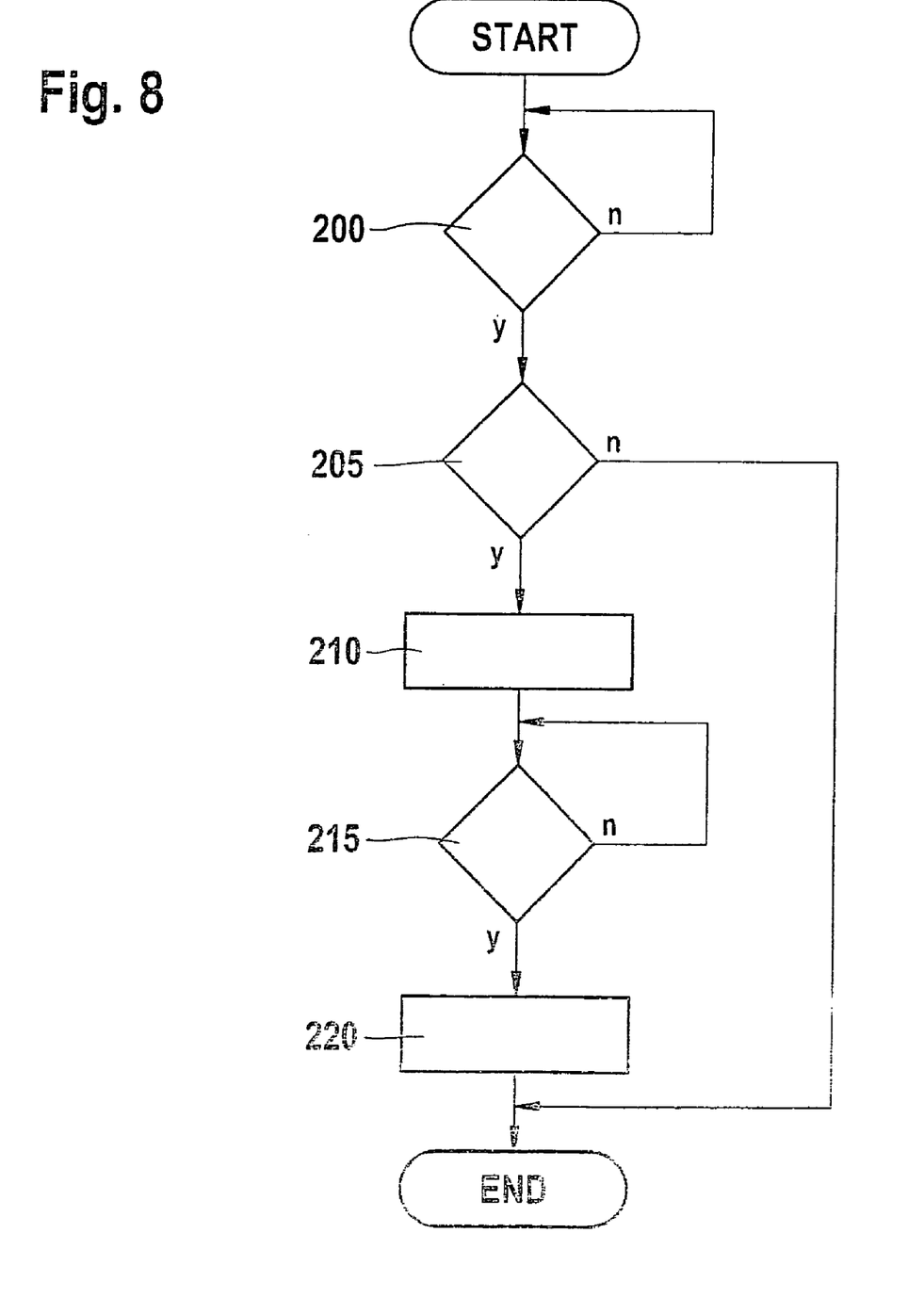
FIG. 8 shows a flow chart for clarifying the method of the present invention with respect to the prevention of HC emissions.

The process of the method of the present invention with respect to the prevention of HC emissions is shown by way of example in a flow chart according to FIG. 8. In this context, the program is implemented in control unit 24, for example. After the program is started, a check is performed at program point 200 to determine whether internal combustion engine 1 was shut off and is at a still stand. If this is the case, the program branches to a program point 205, otherwise the program branches back to program point 200. A speed sensor not shown in the figures that determines the speed of the internal combustion engine and transmits this to control unit 24 may be used for this purpose. If the recorded rotational speed is not equal to zero, the control unit detects still stand of internal combustion engine 1, otherwise internal combustion engine 1 is still running.

At program point 205, control unit 24 checks on the basis of the measured or modeled catalytic converter temperature whether the catalytic converter temperature is greater than predetermined threshold value Ts. If this is the case, the program branches to a program point 210, otherwise the program is exited and the catalytic converter temperature is considered to be insufficient for complete combustion of the HC residues or emissions. Predetermined threshold value Ts may be selected to be 300° C., for example. It is assumed in this context that exhaust-gas device 23 is configured as a catalytic converter.

This is based on the fact that the emission control system, catalytic converter 23 in this example, must be active to convert the HC emissions. Therefore, other indications that allow the conclusion that the emission control system is ready for operation may also be used. For example, these indications may be an engine temperature, a distance traveled, or an operating time of the engine since the last start.

At program point 210, control unit 24 causes electric motor 10 to be switched on or controlled in a timed manner at a minimal torque. In this context, valves 13 and 14 are opened in the manner described in FIG. 6 to allow the air flow from induction region 7 through internal combustion engine 1 into exhaust-gas pipe region 5. If there is no such fully variable valve control but instead valves 13 and 14 are operated via camshafts 16 and 17 according to FIG. 1, it must be ensured in the manner described in FIG. 1 that there is a valve overlap in order to allow the desired air flow from induction region 7 to exhaust-gas pipe region 5.

The program subsequently branches to a program point 215. At program point 215, control unit 24 checks whether an engine temperature of internal combustion engine 1 is less than a predefined threshold value Tm. The predefined threshold value may be 10° C., for example. Additionally or alternatively, control unit 24 may check whether the measured or modeled catalytic converter temperature is less than further threshold value Ts_end. Further threshold value Ts_end may be selected to be 250° C., for example. Additionally or alternatively, control unit 24 may check whether the time elapsed since electric motor 10 was switched on exceeds threshold value ts. If one of the three indicated conditions is met, the program branches to a program point 220, otherwise the program branches back to program point 215.

If internal combustion engine 1 cools to less than a predefined threshold value Tm or catalytic converter 23 cools to less than additional threshold value Ts_end, it is assumed that further combustion of HC residues in catalytic converter 23 is no longer possible. In contrast, threshold value ts for the elapsed time since activation of electric motor 10 is to be selected such that combustion of the HC residues that is as complete as possible is ensured.

At program point 220, control unit 24 causes electric motor 24 to be switched off, thereby ending the air flow from induction region 7 through internal combustion engine 1 to exhaust-gas pipe region 5. As a result, further combustion of HC residues is prevented.

The program is subsequently exited. The program is able to be restarted for every activated internal combustion engine.

The HC emissions are greatest following shutoff of internal combustion engine 1, especially when internal combustion engine 1 is still warm. This is due among other things to crankcase ventilation 100. If a lighter air flow is generated with the help of electric motor 10 and as such electric turbocharger 6, the HC emissions are transported in the direction of exhaust-gas pipe system 5 and are converted in catalytic converter 23. Several minutes after activation of electric turbocharger 6, the HC emissions are removed from induction region 7 in this manner, and electric turbocharger 6 is able to be switched back off once threshold value ts has elapsed.

As a result, the HC emissions are largely prevented from escaping into the environment following shutoff of internal combustion engine 1.

What is claimed is:

1. A method for operating an internal combustion engine, comprising:
    conducting air by a blower into an induction region of the internal combustion engine following a shutoff of the internal combustion engine;
    wherein in the internal combustion engine, intake valves and exhaust valves are operated by camshafts, and the intake valves and the exhaust valves of at least one cylinder are moved into a position in which at least one of the intake valves and one of the exhaust valves of a combustion chamber of the internal combustion engine are open at the same time;
    wherein a valve stroke exceeding a minimum valve stroke is set for an engine having combustion chamber filling controlled by a variable stroke of the intake valves.

2. A control unit for operating an internal combustion engine, comprising:
    an arrangement to conduct air by a blower into an induction region of the internal combustion engine following a shutoff of the internal combustion engine;
    wherein in the internal combustion engine, intake valves and exhaust valves are operated by camshafts, and the intake valves and the exhaust valves of at least one cylinder are moved into a position in which at least one of the intake valves and one of the exhaust valves of a combustion chamber of the internal combustion engine are open at the same time;
    wherein a valve stroke exceeding a minimum valve stroke is set for an engine having combustion chamber filling controlled by a variable stroke of the intake valves.

3. A device for operating an internal combustion engine, comprising:
    an arrangement to conduct air by a blower into an induction region of the internal combustion engine following a shutoff of the internal combustion engine, wherein the arrangement includes an electric turbocharger to introduce the air;

wherein in the internal combustion engine, intake valves and exhaust valves are operated by camshafts, and the intake valves and the exhaust valves of at least one cylinder are moved into a position in which at least one of the intake valves and one of the exhaust valves of a combustion chamber of the internal combustion engine are open at the same time;

wherein a valve stroke exceeding a minimum valve stroke is set for an engine having combustion chamber filling controlled by a variable stroke of the intake valves.

4. A device for operating an internal combustion engine, comprising:

an arrangement to conduct air by a blower into an induction region of the internal combustion engine following a shutoff of the internal combustion engine, wherein the arrangement includes an electric turbocharger to introduce the air;

wherein in the internal combustion engine, intake valves and exhaust valves are operated by camshafts, and the intake valves and the exhaust valves of at least one cylinder are moved into a position in which at least one of the intake valves and one of the exhaust valves of a combustion chamber of the internal combustion engine are open at the same time;

wherein at least one of the intake valves and at least one of the exhaust valves of at least one combustion chamber are opened simultaneously in the internal combustion engine having fully variable valve control.

* * * * *